United States Patent [19]

Kataoka et al.

[11] Patent Number: 5,322,369
[45] Date of Patent: Jun. 21, 1994

[54] DYNAMIC PRESSURE BEARING

[75] Inventors: Tadashi Kataoka; Shunsuke Mimura; Yoichi Kanemitsu; Yoshiyuki Maruta; Tatsuo Hinata; Mamoru Suzuki; Manabu Toshimitsu, all of Kanagawa; Shunichi Aiyoshizawa, Tokyo, all of Japan

[73] Assignee: Ebara Corporation, Tokyo, Japan

[21] Appl. No.: 50,727

[22] Filed: Apr. 21, 1993

Related U.S. Application Data

[63] Continuation of Ser. No. 719,493, Jun. 24, 1991, abandoned.

[30] Foreign Application Priority Data

Jun. 27, 1990 [JP] Japan ................. 2-170664

[51] Int. Cl.⁵ .............................. F16C 32/06
[52] U.S. Cl. ............................ 384/1; 384/112
[58] Field of Search .......... 384/1, 112, 102, 123, 384/305

[56] References Cited

U.S. PATENT DOCUMENTS

| 3,339,421 | 9/1967 | Warnock, Jr. |
| 3,351,393 | 11/1967 | Emmerich |
| 3,471,205 | 7/1969 | Farron et al. |
| 4,998,033 | 3/1991 | Hisabe et al. ............. 384/112 |

FOREIGN PATENT DOCUMENTS

| 59-101067 | 6/1984 | Japan |
| 62-252569 | 11/1987 | Japan |
| 63-40624 | 3/1988 | Japan |
| 63-103645 | 5/1988 | Japan |
| 63-285329 | 11/1988 | Japan |
| 2-227869 | 9/1990 | Japan |
| 625242 | 8/1978 | U.S.S.R. |
| 708080 | 1/1980 | U.S.S.R. |
| 877714 | 10/1981 | U.S.S.R. |
| 947494 | 7/1982 | U.S.S.R. |

OTHER PUBLICATIONS

"Patent Abstracts of Japan", vol. 12, No. 342 (EO658) [3159], Sep. 14, 1988.
"Patent Abstracts of Japan", vol. 13, No. 94 (M-804) [3442], Mar. 6, 1989.
"World Patent Index", accession No. 83-H7282K [23], Derwent Publications Ltd. (1982).
"World Patent Index", accession No. 82-L6090E [35], Derwent Publications Ltd. (no date).
Product Engineering, vol. 37, No. 20, Sep. 26, 1966, pp. 76-77, "Bearing Floats Shaft on Air by Vibrating Very Rapidly".
"World Patent Index", accession No. 80-H5283C [35], Derwent Publications Ltd. (no date).
"World Patent Index", accession No. 79-G0871B [28], Derwent Publications Ltd. (no date).
"World Patent Index", Aug. 15, 1990, accession No. 90-207610 [27], Derwent Publications Ltd.

*Primary Examiner*—Lenard A. Footland
*Attorney, Agent, or Firm*—Wenderoth, Lind & Ponack

[57] ABSTRACT

A dynamic pressure bearing is provided with a moving side bearing member and a fixed side bearing member so as to support a rotor for rotation by generating a fluid dynamic pressure between the moving side bearing member and the fixed side bearing member. The dynamic pressure bearing includes a high-frequency exciting device for applying a high-frequency vibration to the fixed side bearing member at the time of at least one of start-up and shutdown of the rotor. In this way, both bearing members are kept almost free from contact with each other and a frictional resistance at start-up and/or shutdown is minimized.

9 Claims, 2 Drawing Sheets

DYNAMIC PRESSURE BEARING

This application is a continuation of parent application Ser. No. 07/719,493 filed Jun. 24, 1991 and now abandoned.

BACKGROUND OF THE INVENTION

1. Field of the Art

The present invention relates to a dynamic pressure bearing.

2. Prior Art

A bearing such as a ball bearing or the like operating on a greased lubrication base has been used prevalently hitherto as a bearing for rotary equipment. However, it is considered preferably that a dynamic pressure pneumatic bearing be used instead of the ball bearing to improve rotation precision and lifetime in such rotary equipment which operate at high speeds and with high precision. However, in a conventional dynamic pneumatic bearing, or thrust bearing, since a frictional resistance between bearing members is so great at the time of start-up, it requires a large starting torque, thus entailing the problem that an excessive motor performance is required, a lifetime of the bearing is limited due to the wear at the time of start-up and so forth.

SUMMARY OF THE INVENTION

The present invention has been devised in view of the circumstances mentioned above, and its object is to provide a dynamic pressure bearing capable of minimizing the frictional resistance between the bearing members at the time when it starts and/or stops, thereby ensuring a smooth start-up and/or shutdown of the rotary equipment.

To solve the aforementioned problems, in a dynamic pressure bearing equipped with both a moving side bearing member and a fixed side bearing member, and rotatably bearing a rotor by generating a fluid dynamic pressure between the moving side bearing member and the fixed side bearing member, the present invention is characterized in that the dynamic pressure bearing includes exciting means for applying a high-frequency vibration to the fixed side bearing member at the time of at least one of the start-up and shutdown of the rotor.

The exciting frequency of the exciting means is preferably made to coincide with the higher mode of resonance frequency of the fixed side bearing member of the dynamic pressure bearing.

Further, the exciting means is preferably made by laminating a piezoelectric element on the fixed side bearing member, and applying a high-frequency voltage to the piezoelectric element for excitation.

When the dynamic pressure bearing is used as a motor bearing supporting a rotor of the motor, an electric power generated by an inertia rotation upon the stopping of the motor could be used as a power source of the exciting means.

When the dynamic pressure bearing is constructed as described above, and a high-frequency vibration is applied to the fixed side bearing member through the exciting means, since a plurality of vibration areas of loop and node are produced on the fixed side bearing member, the fixed side bearing member and the moving side bearing member come in contact instantaneously with each other only at the loop portion. Further a fluid membrane may be produced between the fixed and moving side members by a so-called squeeze effect. Therefore, the bearing members are kept almost free from contact with each other and a frictional resistance is minimized.

The above mentioned as well as other objects, features and advantages of the present invention will become more apparent from the following description when taken in conjunction with the accompanying drawings in which a preferred embodiment of the present invention is shown by way of illustrative examples.

BRIEF DESCRIPTION OF THE DRAWINGS

FIGS. 2(a), (b) are drawings showing a vibrational behavior of the stator side bearing plate, wherein FIG. 2(a) is a plan view of the bearing plate and FIG. 2(b) is a side sectional view of the same.

DETAILED DESCRIPTION OF THE PREFERRED EMBODIMENT

One embodiment of the present invention will now be described with reference to the accompanying drawings.

Figure 1:
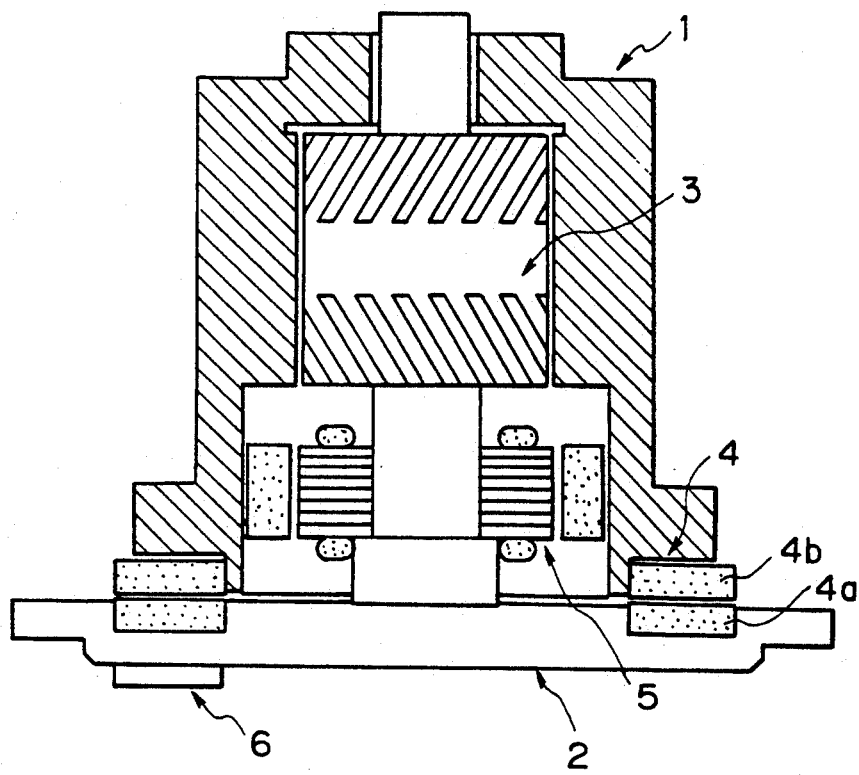
FIG. 1 is a vertical sectional view of an embodiment of a dynamic pressure bearing of the present invention as applied to a spindle motor.

FIG. 1 represents a spindle motor using a dynamic pressure bearing according to the present invention. As illustrated, the spindle motor is equipped with a rotor 1 and a stator 2, the rotor 1 being supported on the stator 2 rotatably through a radial bearing 3 and a thrust bearing 4. The radial bearing 3 is a dynamic pressure herringbone bearing, and the thrust bearing 4 is a dynamic pressure spiral-grooved bearing. The spindle motor is a so-called outer rotor type spindle motor wherein the rotor 1 is rotated on the radial bearing 3 and the thrust bearing 4 upon actuation of a motor 5.

A piezoelectric element 6 functioning as an actuator of a high-frequency exciting device is mounted on a lower portion of the stator 2. By applying an AC voltage generated in a high-frequency oscillation circuit (not indicated) to the piezoelectric element 6, a high-frequency vibration is applied to the stator 2 of the spindle motor. The high-frequency excitation is effected by interlocking the high-frequency exciting device with the drive circuit (not indicated) of the motor 5 so as to be effected only at the time of start-up and shutdown of the motor 5.

By exciting the stator 2, a stator side bearing plate 4a of the thrust bearing 4 (dynamic pressure spiral-grooved bearing) is excited. The excitation is carried out at a resonance frequency of the stator side bearing plate 4a.

Figure 2A:
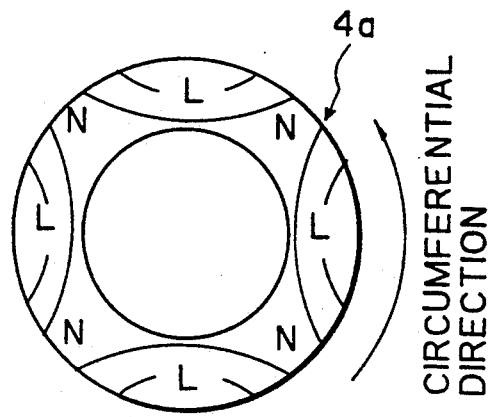
Figure 2B:
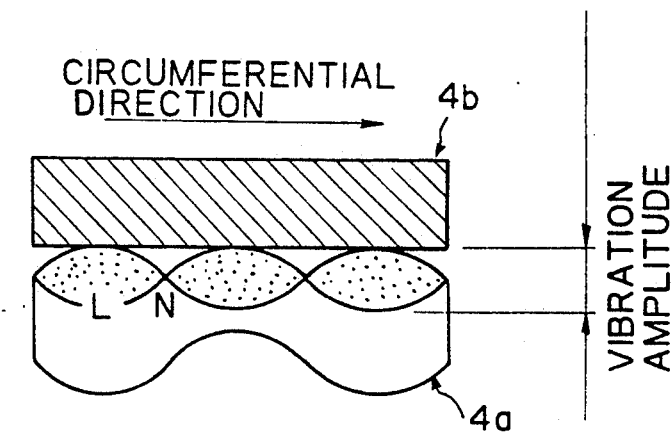

FIGS. 2(a), (b) show a vibration behavior of the stator side bearing plate 4a. Vibration in the form of a standing wave having a plurality of loops L and nodes N is obtainable, as illustrated, by exciting the stator side bearing plate 4a. In this case the stator side bearing plate 4a and the rotor side bearing plate 4b of the thrust bearing 4 come in contact only at a loop portion of the vibration, and, the rotor side bearing plate 4b and thus the rotor 1 almost come to a stop at a position where the vibration amplitude is maximized, as shown in FIG. 2(b), due to an inertia acting on the rotor 1. Since the vibration frequency is high normally from several kHz to several tens of kHz, a contact of the stator side bearing plate 4a with the rotor side bearing plate 4b is instantaneous, and further a formation of an air membrane according to a so-called squeeze effect can be expected. Accordingly, the stator side bearing plate 4a and the rotor side bearing plate 4b are kept almost free from contact with each other, and thus a frictional resistance is minimized.

Therefore, by providing high-frequency exciting means, the spindle motor can be actuated with an extremely small torque and a wear between the stator side bearing plate 4a and the rotor side bearing plate 4b at the time of actuation is minimized as well. Further, by effecting a high-frequency excitation at the time of shutdown, wear is also minimized. By using electric power generated by the motor 5 due to an inertia rotation of the rotor 1 as a power source for the high-frequency oscillation circuit for applying a high-frequency voltage to the piezoelectric element 6 at the time of shutdown, the high-frequency oscillation circuit may be constructed as a simple circuit which functions as a damping device at the same time.

Figure 3:
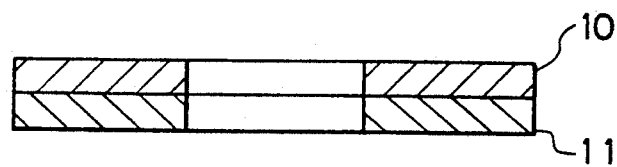
FIG. 3 is a side sectional view of a piezoelectric element stacked bearing plate which is used as an exciting means in the dynamic pressure bearing of the present invention.

Although FIG. 1 exemplifies the case where the piezoelectric element 6 is mounted on a bottom of the stator 2, that is, outside of the spindle motor, the invention is not necessarily limited thereto. For example, FIG. 3 shows that by stacking a bearing plate 10 and a piezoelectric element 11, an excitation of the bearing plate 10 becomes more dependable, and an enhancement of the above-mentioned effect by excitation can further be expected.

Further, although the invention is applied to a spiral-grooved thrust bearing in the above-described embodiment, it may also be applied, to different types of dynamic pressure bearings.

In addition, the present invention involves the application of a high-frequency vibration to the dynamic pressure bearing by way of exciting means to decrease the starting torque of the dynamic pressure bearing. Therefore, a bearing rigidity could be improved by applying a large preload to the dynamic pressure bearing, for example, by means of a magnetic force.

Further, in the above-described embodiment, although the high-frequency excitation is effected at the time of both start-up and shutdown of the motor, the wear of the dynamic pressure bearing is substantially decreased by applying the high-frequency excitation at either the start-up or shutdown of the rotor.

As described above, according to the present invention, the following advantageous effects will be obtainable.

(1) By applying a high-frequency vibration to the dynamic pressure bearing by the exciting means, the fixed side bearing member and the moving side bearing member are kept almost free from contact with each other and, therefore, a frictional resistance at the time of start-up and/or shutdown of a rotor will be minimized.

(2) When the dynamic pressure bearing is used as a motor bearing, by using an electric power generated by the inertia rotation of a rotor upon stop of the motor as a power source for the exciting means, a high-frequency oscillation circuit for the exciting means could be constructed as a simple circuit which functions as a damping device at the same time.

(3) By applying a large preload to the dynamic pressure bearing, for example, by means of a magnetic force, bearing rigidity may be improved.

What is claimed is:

1. The combination of a motor including a rotor and a stator, and a dynamic pressure thrust bearing supporting the rotor for rotation, said dynamic pressure thrust bearing including a fixed side bearing member supporting said rotor in the axial direction thereof and supported on said stator in a manner fixed in said motor relative to the rotor, a moving side bearing member confronting said fixed side bearing member and connected to said rotor, and high-frequency exciting means for exciting high-frequency vibrations in the form of a standing wave in said fixed side bearing member when at least one of the start-up and shutdown of the rotation of the rotor occurs in said motor thereby minimizing frictional resistance between said bearing members at the time of the start-up and/or shutdown of the rotation of the rotor, said high-frequency exciting means including an actuator disposed on said stator, said motor producing electrical energy by the rotation of said rotor under its own inertia after power to the motor is interrupted, and said high-frequency exciting means being operatively associated with said motor so as to be powered by the electrical energy produced by said motor.

2. The combination of a motor and a dynamic pressure bearing as claimed in claim 1, wherein said high-frequency exciting means excites the vibrations in said fixed side bearing member at a frequency coinciding with a higher mode of the resonance frequency of said fixed side bearing member.

3. The combination of a motor and a dynamic pressure bearing as claimed in claim 1, wherein said thrust bearing has spirally extending grooves extending therein and defined at confronting surfaces of said bearing members.

4. The combination of a motor including a rotor and a stator and a dynamic pressure thrust bearing supporting the rotor for rotation, said dynamic pressure thrust bearing including a fixed side bearing member supporting said rotor in the axial direction thereof and fixed in said motor relative to the rotor thereof, a moving side bearing member confronting said fixed side bearing member and connected to said rotor, and high-frequency exciting means for exciting high-frequency vibrations in the form of a standing wave in said fixed side bearing member when at least one of the start-up and shutdown of the rotation of the rotor occurs in said motor thereby minimizing frictional resistance between said bearing members at the time of the start-up and/or shutdown of the rotation of the rotor, said motor producing electrical energy by the rotation of said rotor under its own inertia after power to the motor is interrupted, said high-frequency exciting means including an actuator stacked on said fixed side bearing member, and said high-frequency exciting means being operatively associated with said motor so as to be powered by the electrical energy produced by said motor.

5. The combination of a motor and a dynamic pressure bearing as claimed in claim 4, wherein said motor is a spindle motor.

6. The combination of a motor and a dynamic pressure bearing as claimed in claim 5, wherein said motor includes a radial bearing, and said rotor extends around said radial bearing such that said radial bearing bears radial forces exerted by the rotor.

7. The combination of a motor and a dynamic pressure bearing as claimed in claim 4, wherein said motor is a spindle motor.

8. The combination of a motor and a dynamic pressure bearing as claimed in claim 7, wherein said motor includes a radial bearing, and said rotor extends around said radial bearing such that said radial bearing bears radial forces exerted by the rotor.

9. The combination of a motor and a dynamic pressure bearing as claimed in claim 4, wherein said thrust bearing has spirally extending grooves extending therein and defined at confronting surfaces of said bearing members.

* * * * *